(12) United States Patent
Lassila et al.

(10) Patent No.: US 8,076,034 B1
(45) Date of Patent: Dec. 13, 2011

(54) CONFINEMENT OF HYDROGEN AT HIGH PRESSURE IN CARBON NANOTUBES

(75) Inventors: David H. Lassila, Aptos, CA (US); Brian P. Bonner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 12/233,388

(22) Filed: Sep. 18, 2008

Related U.S. Application Data

(60) Provisional application No. 60/994,757, filed on Sep. 20, 2007.

(51) Int. Cl.
*H01M 8/00* (2006.01)
*C01B 3/02* (2006.01)
*C01B 31/08* (2006.01)
*B01J 2/00* (2006.01)
*B01J 20/02* (2006.01)
*B01J 20/00* (2006.01)
*B01J 20/22* (2006.01)
*B01J 29/04* (2006.01)

(52) U.S. Cl. ............ 429/400; 423/648.1; 502/416; 502/400; 502/406; 502/414; 502/401; 502/60; 977/742; 977/762

(58) Field of Classification Search .................. None
See application file for complete search history.

(56) References Cited

U.S. PATENT DOCUMENTS

| | | | |
|---|---|---|---|
| 5,453,413 A * | 9/1995 | Eklund | 502/416 |
| 6,290,753 B1 * | 9/2001 | Maeland et al. | 95/116 |
| 6,596,055 B2 * | 7/2003 | Cooper et al. | 95/116 |
| 6,735,960 B2 * | 5/2004 | Mao et al. | 62/46.1 |
| 2004/0048744 A1 * | 3/2004 | Iijima et al. | 502/416 |
| 2005/0118091 A1 | 6/2005 | Cooper et al. | 423/447.1 |
| 2008/0112881 A1 * | 5/2008 | Lipson et al. | 423/648.1 |
| 2009/0123789 A1 * | 5/2009 | Cooper et al. | 429/13 |
| 2009/0272935 A1 * | 11/2009 | Hata et al. | 252/70 |

FOREIGN PATENT DOCUMENTS

WO WO 2008140747 A1 * 11/2008

OTHER PUBLICATIONS

Belyakov et al.; Hydrogen Permeability of Some Transition Metals and Metals of Group I in the Periodic System; Fiziko-Khimicheskaya Mekhanika Materialov; vol. 3, No. 3, pp. 344-351, 1967.*
Lipson et al., "Evidence for Large Hydrogen Storage Capacity In Single-Walled Carbon Nanotubes Encapsulated by Electroplating Pd Onto A Pd Substrate" The American Physical Society, Physical Review B 77, 081405(R) (2008).

* cited by examiner

*Primary Examiner* — Melvin Mayes
*Assistant Examiner* — Guinever Gregorio (57) ABSTRACT

A high pressure hydrogen confinement apparatus according to one embodiment includes carbon nanotubes capped at one or both ends thereof with a hydrogen-permeable membrane to enable the high pressure confinement of hydrogen and release of the hydrogen therethrough. A hydrogen confinement apparatus according to another embodiment includes an array of multi-walled carbon nanotubes each having first and second ends, the second ends being capped with palladium (Pd) to enable the high pressure confinement of hydrogen and release of the hydrogen therethrough as a function of palladium temperature, wherein the array of carbon nanotubes is capable of storing hydrogen gas at a pressure of at least 1 GPa for greater than 24 hours. Additional apparatuses and methods are also presented.

19 Claims, 5 Drawing Sheets

CONFINEMENT OF HYDROGEN AT HIGH PRESSURE IN CARBON NANOTUBES

RELATED APPLICATIONS

This application claims priority to provisional U.S. application Ser. No. 60/994,757 filed on Sep. 20, 2007, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to hydrogen confinement, and more particularly to confinement of hydrogen in nanotubes.

BACKGROUND

Nanotubes consisting of one wall are called single wall carbon nanotubes (SWCNTs) and have diameters ranging from about 0.4 nm to about 10 nm. SWCNTs are relatively rare and difficult to produce and characterize. Many theoretical studies have focused on SWCNTs because of their uniform and relatively simple atomic structures. In general, there is excellent agreement between theory and experiments on the various effects of atomic structure and the diameter of the nanotube on, for example, electron transport (conducting and semi-conducting nanotubes) and elastic properties.

Multi-walled carbon nanotubes (MWCNTs) include concentric nanotubes with an inter-wall spacing of about 0.34 nm and outside diameters on the order of about 10 to about 100 nm. MWCNTs have gained increasing interest in various industrial and technological applications because of the development of techniques to produce bulk quantities of high-quality nanotubes with uniform diameters, number of walls, and atomic structure.

There have also been extensive experimental studies on the ability of MWCNTs and other carbon nanomaterials to "store" hydrogen ($H_2$) at low pressure (on the order of 0.01 GPa or less) for the purpose of containing the gas safely in automobile fuel tanks. However, low pressure "storage" is very different than the high-pressure storage as discussed herein. Low pressure "storage" mainly refers to an equilibrium distribution of relatively low-pressure hydrogen gas in and around the materials of interest and causes little or no stress in the nanotubes or nanotube bundles.

The first reported experiments that demonstrated the storage capability of MWCNTs were performed on the confinement of argon. In these experiments, bundles of MWCNTs were subjected to argon gas at a pressure of about 0.17 GPa at a temperature of about 650° C. for 48 hours. Upon releasing the sample to atmospheric pressure, some of the nanotubes were found to retain argon at pressures of about 0.06 GPa. In another work, the confinement of $SF_6$, carbon dioxide, and $^{13}CO_2$ in SWCNT bundles was studied. Open-ended SWNTs were charged with gas cryogenically, and the ends were subsequently closed by functionalization with ozone. The samples were stabilized in vacuum for at least 24 hours. After stabilization, they were found to desorb the retained gas upon heating to 700° C. in vacuum which indicated the various gasses were confined to the interior of the nanotubes.

SUMMARY

A high pressure hydrogen confinement apparatus according to one embodiment includes carbon nanotubes capped at one or both ends thereof with a hydrogen-permeable membrane to enable the high pressure confinement of hydrogen and release of the hydrogen therethrough.

A hydrogen confinement apparatus according to another embodiment includes an array of multi-walled carbon nanotubes each having first and second ends, the second ends being capped with palladium (Pd) to enable the high pressure confinement of hydrogen and release of the hydrogen therethrough as a function of palladium temperature, wherein the array of carbon nanotubes is capable of storing hydrogen gas at a pressure of at least 1 GPa for greater than 24 hours.

A method of storing high pressure hydrogen in carbon nanotubes includes providing carbon nanotubes being capped with a metallic hydrogen-permeable material at one or both ends thereof, placing the carbon nanotubes in an electrolytic solution, and arranging the hydrogen-permeable material as the cathode of an electrolytic circuit, and performing cathodic charging by providing a voltage potential to the electrolytic circuit to charge the carbon nanotubes with high pressure hydrogen via permeation through the hydrogen-permeable material.

A method of storing high pressure hydrogen in carbon nanotubes according to another embodiment includes providing carbon nanotubes capped at one or both ends thereof with a metallic hydrogen-permeable membrane that allows permeation of hydrogen therethrough more readily at elevated temperatures and restricts permeation of hydrogen therethrough at lower temperatures, placing the carbon nanotubes in a hydrogen gas environment, and performing thermal charging by heating the carbon nanotubes and the hydrogen gas environment to at least 300° C. to charge the carbon nanotubes with high pressure hydrogen via permeation through the metallic hydrogen-permeable membrane.

A method for extracting hydrogen from carbon nanotubes includes breaking carbon nanotubes having high pressure hydrogen stored therein.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations, and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Various embodiments of the present invention involve the storage of hydrogen gas at high pressure (greater than about 0.1 GPa, e.g., 0.1±0.05 GPa). Various embodiments also involve the use of MWCNTs to confine hydrogen gas at high pressure. It does not appear that any experimental work has been previously performed to study the confinement of hydrogen in nanotubes at high pressures, outside of the inventors' own work. Gases with larger atomic or molecular sizes such as argon and carbon dioxide have been successfully stored at pressures up to about 0.1 GPa, but not hydrogen.

A system in one general embodiment includes a high pressure hydrogen confinement apparatus comprising carbon nanotubes capped at one or both ends thereof with a hydrogen-permeable membrane to enable the high pressure confinement of hydrogen and release of the hydrogen therethrough.

A system in another general embodiment includes a hydrogen confinement apparatus comprising an array of multi-walled carbon nanotubes each having first and second ends, the second ends being capped with palladium (Pd) to enable the high pressure confinement of hydrogen and release of the hydrogen therethrough as a function of palladium temperature, wherein the array of carbon nanotubes is capable of storing hydrogen gas at a pressure of at least 1 GPa (1,000,000,000 Pascal=10,000 bar) for greater than 24 hours.

A method of storing high pressure hydrogen in carbon nanotubes in one general embodiment includes providing carbon nanotubes capped with a hydrogen-permeable material at one or both ends thereof; placing the carbon nanotubes in an electrolytic solution, and arranging the hydrogen-permeable material as the cathode of an electrolytic circuit; and performing cathodic charging by providing a voltage potential to the electrolytic circuit to charge the carbon nanotubes with high pressure hydrogen via permeation through the hydrogen-permeable material.

A method of storing high pressure hydrogen in carbon nanotubes in another general embodiment includes providing carbon nanotubes capped at one or both ends thereof with a metallic hydrogen-permeable membrane that allows permeation of hydrogen therethrough more readily at elevated temperatures and restricts permeation of hydrogen therethrough at lower temperatures; placing the carbon nanotubes in a hydrogen gas environment; and performing thermal charging by heating the carbon nanotubes and the hydrogen gas environment to at least 300° C. to charge the carbon nanotubes with high pressure hydrogen via permeation through the metallic hydrogen-permeable membrane.

A method for removing hydrogen from carbon nanotubes in one general embodiment includes breaking carbon nanotubes having high pressure hydrogen stored therein.

There are several important aspects to using MWCNTs to "store" or confine hydrogen at high pressure, including: 1) loading the MWCNTs with hydrogen at high pressure, 2) keeping the hydrogen "stored," and 3) controlling the release of the "stored" hydrogen gas. All three aspects may be addressed by the use of a selectively-hydrogen-permeable membrane such as a palladium membrane to selectively seal one end of the carbon nanotubes. Note that any such sealing may or may not be a completely hydrogen-tight seal. In the latter case, the seal may allow for some leakage of hydrogen therethrough.

The carbon nanotubes may be arranged in an array or bundle, and will be referred to as an array of carbon nanotubes throughout, but this does not in any way limit the choice of nanotube preparation or arrangement, and is meant to only simplify the descriptions contained herein.

Figure 1:
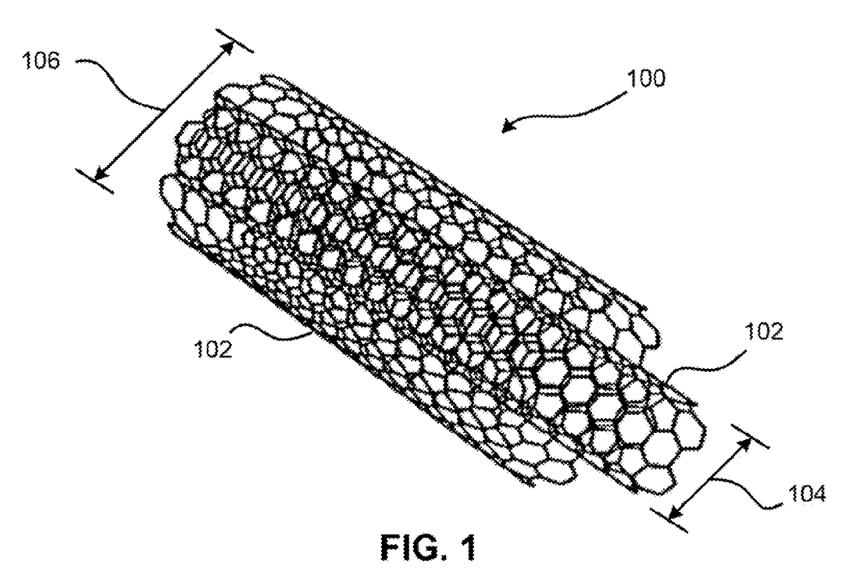
FIG. 1 is a schematic diagram of two nested single-walled carbon nanotubes, which may comprise a single multi-walled carbon nanotube according to one embodiment.

Now referring to FIG. 1, a schematic diagram of two "nested" SWCNTs 102 is shown. This type of arrangement might comprise a single MWCNT 100. As can be seen in FIG. 1, there are two dimensions that can be set which may alter the characteristics of the MWCNT 100, the diameter of the inner SWCNT 104, and the diameter of the exterior SWCNT 106.

The inherent high elastic and mechanical strength properties of the SWCNTs coupled with the "thick-walled cylinder" geometry of the MWCNT can provide confinement capability where the exterior of the nanotube is exposed to ambient pressure (1 atmosphere, air). Studies of the tensile strength of MWCNTs suggest strengths of approximately 100 GPa. Using this value of strength, and assuming a MWCNT geometry as shown in FIG. 1, a back of the envelope approach suggests the maximum pressure of hydrogen that can be contained is in excess of 100 GPa.

It is important to point out that there have been extensive experimental studies on the ability of MWCNTs and other carbon nanomaterials to "store" hydrogen for the purpose of containing the gas safely in automobile fuel tanks. However, "storage" is very different than the high-pressure "confinement" as addressed herein. "Storage" mainly refers to an equilibrium distribution of relatively low pressure hydrogen gas in and around the materials of interest and causes little or no stress in the nanotubes or nanotube arrays.

Figure 2A:
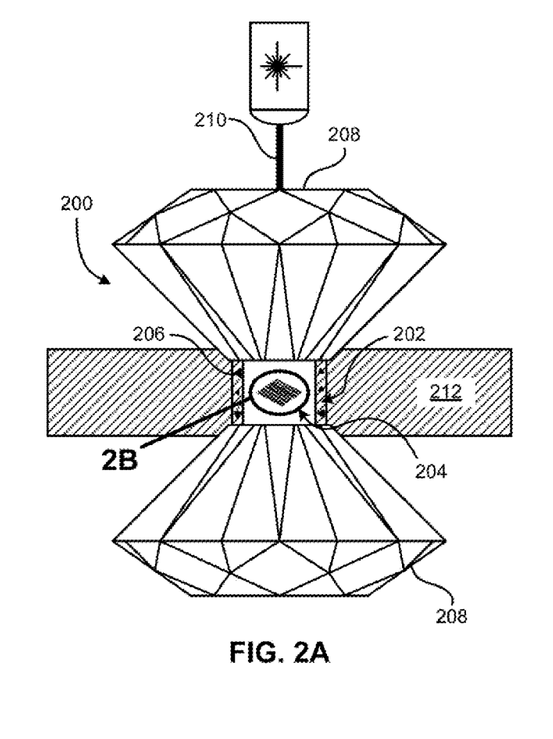
FIG. 2A is a schematic diagram of a hydrogen confining apparatus being loaded with high pressure hydrogen in a diamond anvil cell (DAC) according to one embodiment.
Figure 2B:
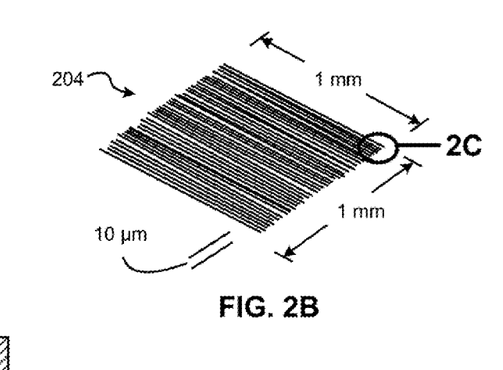
FIG. 2B is a blown-up view taken from circle 2B in FIG. 2A of an array of nanotubes without end caps, arranged in a uniform vertical fashion according to one embodiment.

In order to confine a quantity of hydrogen in MWCNTs, many MWCNTs may be used in an array, as shown in FIG. 2B, which is a blown-up view taken from circle 2B in FIG. 2A. This is a vertically aligned array of MWCNTs that, in this example, may measure about 1 mm wide by about 1 mm long, with the stack height possibly being about 10 μm (microns). The dimensions of the MWCNT array may be adjusted larger or smaller, depending on the quantity of hydrogen to be stored, and/or the ability of the MWCNT array to be handled in larger sizes. Thus, for example, the array may include 2 to several million nanotubes, with an array height of 1 to tens of thousands of nanotube diameters, and a length of tens of microns to tens of millimeters.

Figure 2C:
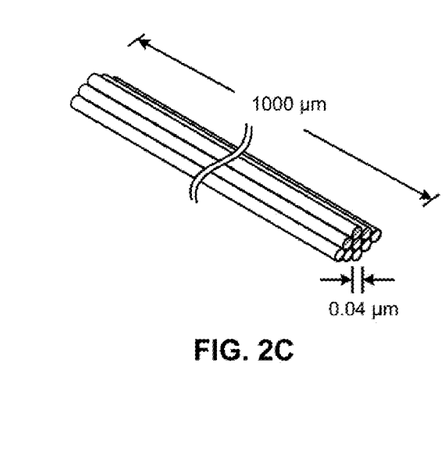
FIG. 2C is a blown-up view taken from circle 2C in FIG. 2B of carbon nanotubes according to one embodiment.

The individual nanotubes, shown in FIG. 2C which is a blown-up view taken from circle 2C in FIG. 2B, will be similar to the MWCNT shown in FIG. 1. Alternatively, the individual nanotubes may be of a type not shown in FIG. 1. Each individual nanotube may have a mean diameter of about 30 nm with a length of about 1 cm. One portion of sample preparation involves the closure of the ends of the nanotube array (not shown in FIGS. 2A-2C) via chemical vapor deposition (CVD) of gold (Au) or some other suitable material with an accompanying anneal. In addition to adjusting the size of each array of MWCNTs, a plurality of MWCNT arrays may be used together to confine even more hydrogen.

Various methods of filling the MWCNT arrays with hydrogen may be used. Two such filling methods are thermal charging in hot hydrogen gas and cathodic charging using an electro-chemical technique. First, filling of the MWCNT arrays with hydrogen using thermal charging will be discussed.

The MWCNT arrays may be heated in a high pressure chamber capable of sustaining a temperature that allows the ingress of hydrogen through the membrane. Any type of chamber may be used. In another approach, the nanotubes may be placed in a cylinder in a piston-and-cylinder system, where the piston compresses the hydrogen in the cylinder to create pressure. The membrane may be heated by a heating element, thermal contact with a heated portion of the cylinder, etc. In another approach, the chamber may be simply a sealed chamber which is heated to create higher temperatures and pressures therein In one particularly preferred approach, presented by way of example only, the MWCNT arrays may be "thermally charged" with hydrogen in a diamond anvil cell (DAC) 200 as shown in FIG. 2A at pressures ranging from about 1 to about 100 GPa. This process involves a gasketed DAC setup. The DAC 200 may include two diamonds 208 on either side of any number of MWCNT arrays, shown in FIG. 2A as a single array 204. A metal gasket 212 holds the two diamonds anvils 208 in place on either side of the charging chamber. Hydrogen gas 202 is present around the MWCNT array 204 for permeation therein. In addition, ruby chips 206 may be scattered around the MWCNT array 204.

The heating of the MWCNT array 204 may be performed with laser light 210 transmitted through one of the diamond anvils 208, as shown in FIG. 2A. Alternately, an external heater capable of heating the sample to 700° C. for several hours may be used. After a MWCNT array 204 is charged with hydrogen 202 and removed from the DAC 200, it may be stored in liquid nitrogen prior to hydrogen release. The low temperature causes the confined hydrogen to condense and thereby reduce the internal pressure in the individual MWCNTs. This reduction of internal pressure reduces the rate of permeation of hydrogen through the walls of the nanotubes during confinement.

Now referring to FIG. 2C, the aspect ratio of the MWCNTs is shown. The aspect ratio is defined as the length divided by the outside diameter of each nanotube. For illustrative purposes, the group of nanotubes is shown with a length of about 1000 μm, and a diameter of about 0.04 μm. This leads to an aspect ratio of about 25,000. Preferably, the aspect ratio of nanotubes used in a nanotube array for storing hydrogen is greater than about 5,000:1, such as 10,000:1, 25,000:1, 30,000:1 or higher.

Figure 3A:
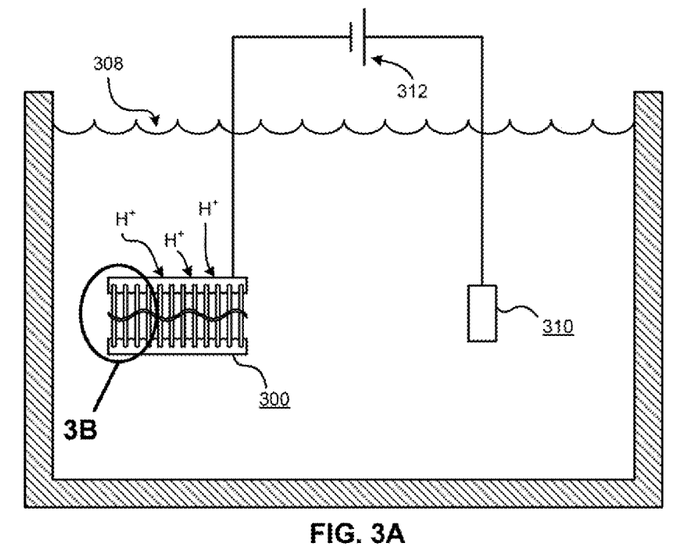
FIG. 3A is a schematic diagram of a cathodic charging system for charging an array of carbon nanotubes with high pressure hydrogen according to one embodiment.
Figure 3B:
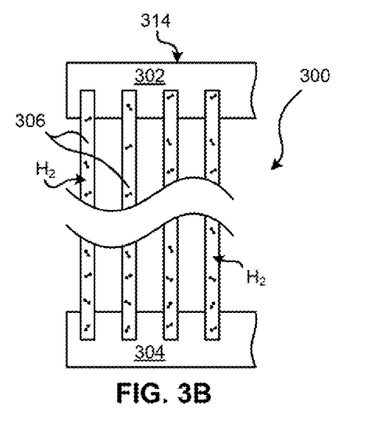
FIG. 3B is a schematic diagram of a carbon nanotube array section according to one embodiment.

Now referring to FIGS. 3A-3B, the nanotube array 300 is described. Preferably, the nanotube array 300 is a MWCNT array that may be filled with hydrogen through cathodic charging. In order for the nanotubes 306 to retain hydrogen, one end of the nanotubes 306 should be capped, as shown in FIG. 3B as end cap 304. End cap 304 may be of any suitable material, preferably a hydrogen impermeable material, and for exemplary purposes, it is gold in FIG. 3B. Other preferred materials include metal and metal alloys, such as aluminum, silver, palladium, etc.

The other end 302 of the nanotubes 306 are encapsulated in another material that acts as a cathode, preferably palladium (Pd), which may cover the entire end of the nanotubes 306 as shown in FIG. 3B, or may be placed only inside the end of each nanotube 306. When multiple MWCNTs are arranged in this fashion with an end cap 304 on one end and a cathode 302 on the other end, they form an array of nanotubes 300 that can be filled with hydrogen through cathodic charging.

In one embodiment, a high pressure hydrogen confinement apparatus comprises an array of carbon nanotubes 300 each having a first end 304, and a second end 302 capped with palladium to enable the high pressure confinement of hydrogen and release of hydrogen therethrough as a function of palladium temperature.

In another embodiment, the hydrogen confinement apparatus comprises an array of MWCNTs 300 each having a first end 304 and a second end 302. The ends may be treated as described above.

In another embodiment, the longitudinal axes of the carbon nanotubes 306 in the array 300 may be about parallel, as shown in FIG. 3B. Further, the second ends 302 may be on the same side of the array 300. Also, the palladium end cap 302 may preferably be a monolithic palladium membrane.

In other embodiments, the nanotube array 300 may be capable of storing hydrogen for at least 24 hours with substantially no leakage at a pressure of at least 1 GPa, at a pressure of least 50 GPa, or at a pressure of least 100 GPa.

Cathodic charging of nanotube arrays 300 that have been capped on one end 302 with palladium, for example via CVD, may be performed in an electrolytic solution 308. Cathodic charging is an electrochemical technique that can introduce hydrogen into palladium. Once introduced, the hydrogen may diffuse through the palladium membrane 302 and form molecular hydrogen gas inside the nanotubes 306. To retain the hydrogen, the palladium membrane 302 may be cooled to a sub-ambient temperature to seal, e.g., prevent or substantially inhibit hydrogen diffusion through the palladium membrane 302, thereby substantially trapping the hydrogen gas inside the nanotube array 300. Any electrolytic solution 308 may be used as is commonly known in the relevant art.

This process of charging the nanotube array 300 may create a hydrogen fugacity on the order of about 1 GPa at the palladium surface 314 adjacent to the electrolytic solution 308, and thus the nanotubes 306 may be filled via hydrogen permeation of the palladium end cap 302 to approximately the same pressure (about 1 GPa). The charging uses a platinum (Pt) anode 310 connected to the palladium end cap (cathode) 302 as shown in FIG. 3A. Outside of the electrolytic solution 308, the circuit includes a cell 312 or other power source to supply power, such as a battery, fuel cell, DC supply, etc., as is commonly known in the relevant art.

Figure 3C:
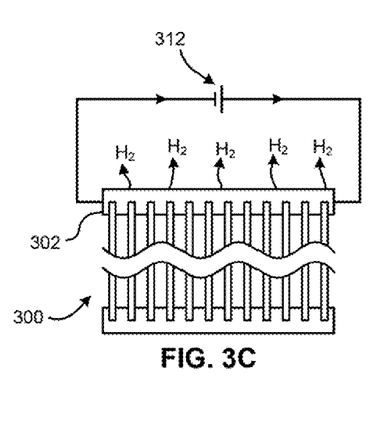
FIG. 3C is a schematic diagram of a resistive (Joule) heating circuit for heating the palladium to release the confined hydrogen from an array of carbon nanotubes according to one embodiment.

Now referring to FIG. 3C, to discharge the hydrogen once it has been confined in the nanotube array 300, the palladium membrane 302 may be heated from the sub-ambient temperature that was introduced to eliminate or substantially inhibit hydrogen diffusion through the palladium membrane 302. The rate of diffusion of hydrogen gas through the palladium membrane 302 may be increased or decreased by controlling the temperature of the palladium membrane 302. In one embodiment, the hydrogen confinement apparatus includes a mechanism for controllably heating the palladium end cap 302 to controllably release confined hydrogen therethrough.

The higher the temperature, the faster the rate of diffusion of hydrogen through the palladium membrane 302. Heating of the palladium membrane 302 may be effected through a resistive (Joule) heating circuit by running an electric current through the membrane 302, as shown in FIG. 3C, or through a heating element near the membrane 302. In the number shown, a power source 312 supplies the current to the palladium membrane 302 in order to heat the material and release the hydrogen gas.

Figure 4:
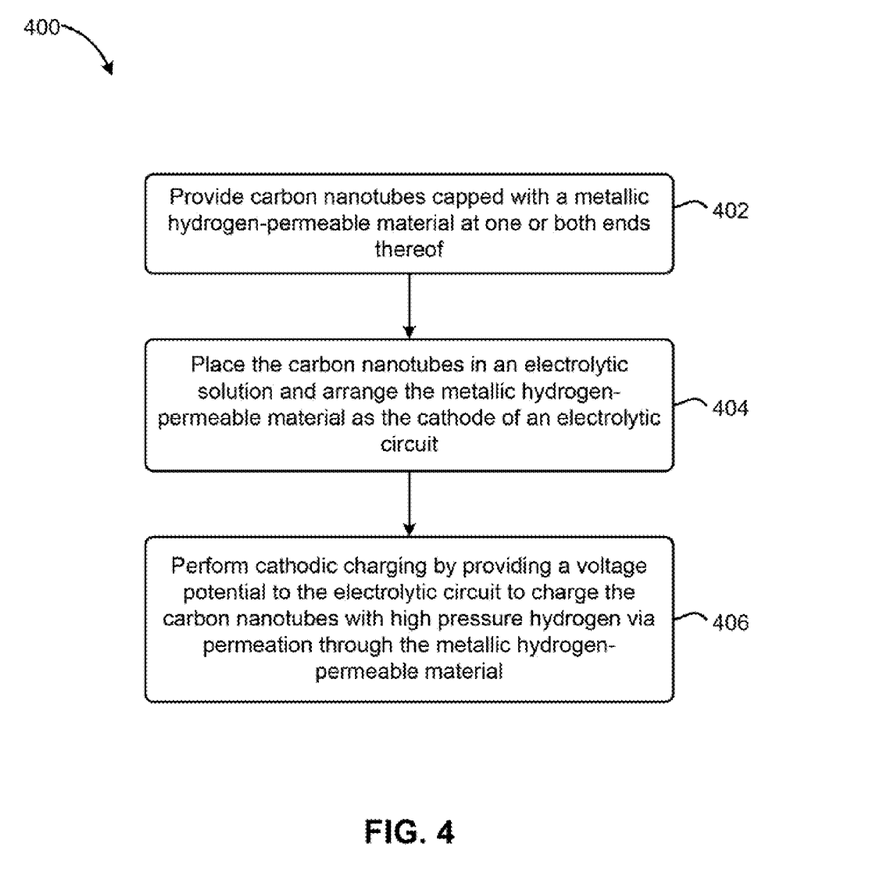
FIG. 4 is a flow diagram of a method of storing high pressure hydrogen in carbon nanotubes according to one embodiment.

Now referring to FIG. 4, a method 400 of storing high pressure hydrogen in carbon nanotubes is shown according to one embodiment. As an option, the present method 400 may be implemented in the context of the functionality and architecture of FIGS. 1, 2A-2C, and 3A-3C. Of course, the method 400 may be carried out in any desired environment. It should also be noted that the aforementioned definitions may apply during the present description.

With continued reference to FIG. 4, in operation 402, carbon nanotubes are provided capped with a metallic hydrogen-permeable material at one or both ends thereof, possibly as shown in FIG. 3B. The metallic hydrogen-permeable material may be palladium, or some other metal or metal alloy suitable for permeating hydrogen therethrough. Ends may also be capped with any other suitable material which can control the diffusion of hydrogen through its boundaries, or with a hydrogen impermeable material. Also, the nanotubes are preferably MWCNTs.

In operation 404, the carbon nanotubes are placed in an electrolytic solution and the metallic hydrogen-permeable material is arranged as the cathode of an electrolytic circuit. This circuit may include a power supply such as those examples listed above, as well as control circuitry for controlling the power supplied to the circuit.

In operation 406, cathodic charging is performed by providing a voltage potential to the electrolytic circuit to charge the carbon nanotubes with high pressure hydrogen via permeation through the metallic hydrogen-permeable material or other suitable material.

As an option, the charged carbon nanotubes may be cooled to trap the high pressure hydrogen therein. Also, the ends of the carbon nanotubes not capped with the metallic hydrogen-permeable material are preferably capped with a hydrogen impermeable material, such as gold, aluminum, or some other suitable metal or metal alloy.

Figure 5:
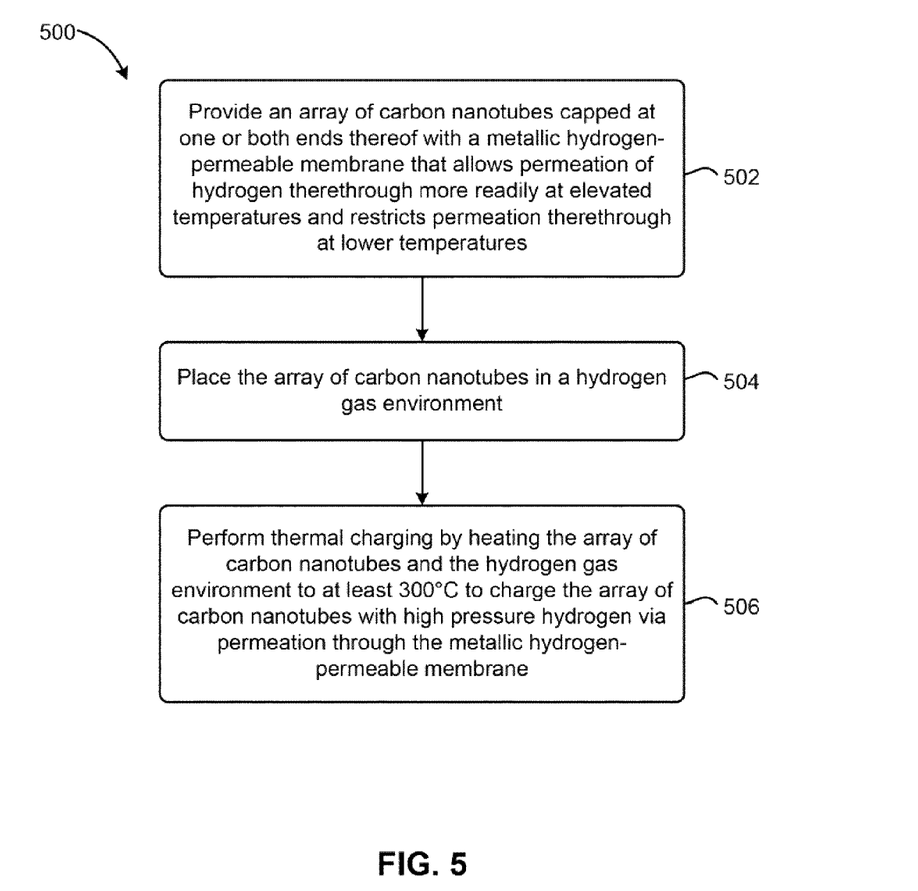
FIG. 5 is a flow diagram of a method of storing high pressure hydrogen in carbon nanotubes according to one embodiment.

Now referring to FIG. 5, another method 500 of storing high pressure hydrogen in carbon nanotubes is shown according to one embodiment. As an option, the present method 500 may be implemented in the context of the functionality and architecture of FIGS. 1, 2A-2C, and 3A-3C. Of course, the method 500 may be carried out in any desired environment. It should also be noted that the aforementioned definitions may apply during the present description.

With continued reference to FIG. 5, in operation 502, an array of carbon nanotubes are provided that are capped with a metallic hydrogen-permeable membrane (pure metal or an alloy) that allows permeation of hydrogen therethrough more readily at elevated temperatures and restricts permeation of hydrogen therethrough at lower temperatures, possibly as shown in FIG. 3B. For example, if the nanotubes are cooled to 77° K, they will have less leakage than at 200° K. Also, an alloy may be used to tune the temperature requirements to store and release hydrogen, e.g., if the ambient storage temperature will be room temperature, the metallic hydrogen-permeable membrane used might have minimal leakage at room temperature to reduce leakage under storage conditions. If the system will be used in a space where the ambient temperature is very low, a metallic hydrogen-permeable membrane that releases hydrogen at a lower temperature may be used to decrease the amount of heat added to release the hydrogen.

In one embodiment, the metallic hydrogen permeable membrane may be palladium, such that the palladium membrane allows permeation of hydrogen at room temperature, but permeation increases significantly at elevated temperatures. Therefore, to store the hydrogen in this and other embodiments, the carbon nanotubes may be cooled to a temperature at which the metallic hydrogen-permeable membrane allows an acceptable amount of permeation of hydrogen therethrough.

The ends opposite those capped with the metallic hydrogen-permeable membrane may also be capped with any other suitable material which can control the diffusion of hydrogen through its boundaries. Also, the carbon nanotubes are preferably MWCNTs.

In operation 504, the array of nanotubes is placed in a hydrogen gas environment. Any hydrogen gas environment which can obtain high enough temperatures and/or pressures may be used. For example, one hydrogen gas environment may be a chamber of a DAC, between two diamond anvils, as depicted in FIG. 2A, In another example, the nanotubes may be placed in a cylinder in a piston-and-cylinder system, where the piston compresses the hydrogen in the cylinder to create pressure. The membrane may be heated by a heating element, thermal contact with a heated portion of the cylinder, etc. In a further approach, the chamber may be simply a sealed chamber which is heated to create higher temperatures and pressures therein.

In operation 506, thermal charging is performed by heating the array of carbon nanotubes and the hydrogen gas environment to at least 300° C. to charge the array of carbon nanotubes with high pressure hydrogen via permeation through the metallic hydrogen-permeable membrane, such as palladium or other suitable material.

In a further embodiment, the charged array of carbon nanotubes may be cooled to trap the high pressure hydrogen therein. Also, the ends opposite the ends capped with the metallic hydrogen-permeable membrane may be preferably capped with a hydrogen impermeable material, such as gold, aluminum, or some other suitable metal or metal alloy.

In one embodiment, as depicted in FIG. 2A, the array of carbon nanotubes 204 may be heated by passing laser light 210 through a diamond anvil 208. In another approach, the array of carbon nanotubes may be heated with an external heater.

In another embodiment, the hydrogen gas environment may preferably have an ambient pressure of at least about 1 GPa.

In another embodiment, the carbon nanotubes with high pressure hydrogen stored therein may be crushed, broken, snapped, shattered, or in some other manner caused to burst or break in order to release the stored hydrogen therein. This method of releasing the stored hydrogen may be used in conjunction with any of the embodiments described herein.

In one embodiment, both ends of the carbon nanotubes may be capped with a hydrogen impermeable membrane, such as gold, aluminum, or some other suitable material or alloy. The nanotubes may be crushed to release the stored hydrogen gas therein, whether capped on both ends with hydrogen impermeable material, or in some other arrangement. The nanotubes may be crushed under pressure such that the internal burst pressure of the nanotubes is reached, resulting in the rupture of the nanotubes.

In another embodiment, since the carbon nanotubes are substantially brittle, the nanotubes may be broken by striking them with an object with sufficient force as to break them open. Also, the nanotubes may be ruptured by striking them on a surface, rather than striking a surface on the nanotubes. Any embodiment of breaking the nanotubes may be performed through controlled disassembly, such as by a system designed for such actions on a group of nanotubes.

In another embodiment, an object may be passed through a group of nanotubes such that the nanotubes are ruptured by the object upon passing through the group or exerting pressure thereon sufficient to rupture the nanotubes. This may be performed using a system designed for such purpose, such as an actuator.

In other embodiments, all carbon nanotubes may be broken at the same time to release hydrogen stored therein. Alternatively, the carbon nanotubes may be grouped such that the release of hydrogen may be controlled through breaking only a portion of the total carbon nanotubes at any one time. This may be used to provide a more consistent stream of hydrogen for subsequent processing, such as in a hydrogen fuel cell.

Other methods of crushing, breaking, snapping, shattering, or in some other manner causing the nanotubes to burst or break in order to release the stored hydrogen therein will be apparent to those skilled in the relevant art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A high pressure hydrogen confinement apparatus comprising:
   an ordered array of carbon nanotubes having longitudinal axes that are substantially parallel, the carbon nanotubes being capped at one or both ends thereof with a hydrogen-permeable membrane to enable the high pressure confinement of hydrogen in the carbon nanotubes and release of the hydrogen therethrough.

2. The high pressure hydrogen confinement apparatus of claim 1, wherein the carbon nanotubes are multi-walled carbon nanotubes (MWCNTs).

3. The high pressure hydrogen confinement apparatus of claim 1, wherein the selectively-hydrogen-permeable membrane capping at least one of the ends is a monolithic membrane.

4. The high pressure hydrogen confinement apparatus of claim 1, wherein one of the ends is capped with a hydrogen impermeable substance.

5. The high pressure hydrogen confinement apparatus of claim 4, wherein the hydrogen impermeable substance is gold.

6. The high pressure hydrogen confinement apparatus of claim 1, wherein the carbon nanotubes are capable of storing hydrogen gas at a pressure of at least 1 GPa for greater than 24 hours.

7. The high pressure hydrogen confinement apparatus of claim 1, wherein the carbon nanotubes are capable of storing hydrogen gas at a pressure of at least 50 GPa for greater than 24 hours.

8. The high pressure hydrogen confinement apparatus of claim 7, wherein the carbon nanotubes are capable of storing hydrogen gas at a pressure of about 100 GPa for greater than 24 hours.

9. The high pressure hydrogen confinement apparatus of claim 1, wherein the hydrogen-permeable membrane comprises palladium (Pd), a release rate of the hydrogen therethrough being a function of palladium temperature.

10. The high pressure hydrogen confinement apparatus of claim 9, further comprising a mechanism for controllably heating the palladium to controllably release stored hydrogen therethrough.

11. The high pressure hydrogen confinement apparatus of claim 10, wherein said mechanism for controllably heating the palladium includes a resistive (Joule) heating circuit.

12. The high pressure hydrogen confinement apparatus of claim 1, wherein an aspect ratio of a plurality of the carbon nanotubes is greater than about 5000:1.

13. The high pressure hydrogen confinement apparatus of claim 1,
   wherein ends of the carbon nanotubes are capped, and
      wherein the capped ends and interior wall of each of the carbon nanotubes define a hollow interior in each of the carbon nanotubes,
   the hollow interior being for high pressure confinement of hydrogen therein.

14. The high pressure hydrogen confinement apparatus of claim 13, with the proviso that the hydrogen-permeable membrane is only located at one or both ends of the carbon nanotubes.

15. The high pressure hydrogen confinement apparatus of claim 13, wherein the hollow interior is capable of high pressure confinement of hydrogen in a gaseous form therein at a pressure of at least 1 GPa for at least 24 hours when exteriors of the nanotubes are exposed to an ambient pressure of 1 atmosphere.

16. A hydrogen confinement apparatus, comprising:
   an ordered array of multi-walled carbon nanotubes having longitudinal axes that are substantially parallel, each carbon nanotube having first and second ends, the second ends of each carbon nanotube being capped with palladium (Pd) to enable the high pressure confinement of hydrogen in the carbon nanotubes and release of the hydrogen therethrough as a function of palladium temperature,
   wherein the array of carbon nanotubes is capable of storing hydrogen gas at a pressure of at least 1 GPa for greater than 24 hours.

17. The high pressure hydrogen confinement apparatus of claim 16,
   wherein the first ends of each of the carbon nanotubes are capped with gold to enable the confinement of hydrogen and prevent the release of the hydrogen therethrough at room temperature.

18. A high pressure hydrogen confinement apparatus comprising:
   an ordered array of carbon nanotubes having longitudinal axes that are substantially parallel, the carbon nanotubes being capped at both ends, wherein at least one of the capped at both ends, wherein at least one of the ends is capped with a hydrogen-permeable membrane,
   wherein the capped ends and an interior wall of each of the carbon nanotubes define a hollow interior in each of the carbon nanotubes, and
   wherein the interior wall is characterized as capable of high pressure confinement of gaseous hydrogen therein at a pressure of at least 1 GPa for at least 24 hours when exteriors of the nanotubes are exposed to an ambient pressure of 1 atmosphere.

19. The high pressure hydrogen confinement apparatus of claim 18, wherein longitudinal axes of the carbon nanotubes are substantially parallel.

* * * * *